May 7, 1963 D. W. BOENSEL 3,089,041

REDUCED TURN-OFF TIME TRANSISTOR SWITCH

Filed Dec. 14, 1960

Donald W. Boensel,
INVENTOR.
BY S. J. Rotondi
A. T. Dupont
C. A. Phillips
ATTORNEYS.

3,089,041
Patented May 7, 1963

3,089,041

REDUCED TURN-OFF TIME TRANSISTOR SWITCH

Donald W. Boensel, La Crescenta, Calif., assignor, by mesne assignments, to the United States of America as represented by the Secretary of the Army Filed Dec. 14, 1960, Ser. No. 75,894
1 Claim. (Cl. 307—88.5)

This invention relates generally to transistor switches and particularly to an improved transistor switching circuit employing a tetrode type, double base, transistor.

It has been determined that a major problem in transistor switches is the effect of residual minority carriers on turn-off time. If, during the "on" time, the switch is driven into saturation to decrease the turn-on time, injected carriers are stored in the base region because there is no field at the collector base junction to draw them into the collector. Even if the drive pulse is such as to go in the reverse polarity direction during the "off" time, most of the drive voltage is developed across the back-biased emitter-base diode and very little in the base region. As long as a great quantity of minority carriers remains in the base, collector current will continue to flow with no injected emitter drive current. This is undesirable, not only because it limits the maximum frequency of transistor switches but also because it results in a considerable amount of power dissipation in an otherwise almost dissipationless mode of operation.

In accordance with the present invention, the problem set forth above is eliminated by causing the injected carriers to be swept out of the base region when the drive dictates that the switch should be off. To accomplish this, means are provided to exert an electric field in the base when the drive tends to turn the transistor off. This means comprises a switching circuit which employs a tetrode transistor as the active element. In it a source of input switching potential, to provide a swing into the cutoff region, is connected to the transistor between one base terminal and the emitter, and between base terminals. A low impedence path is provided between the second base terminal and the switching potential source, at least during the period when the switching potential is of a cutoff polarity.

Figure 1:
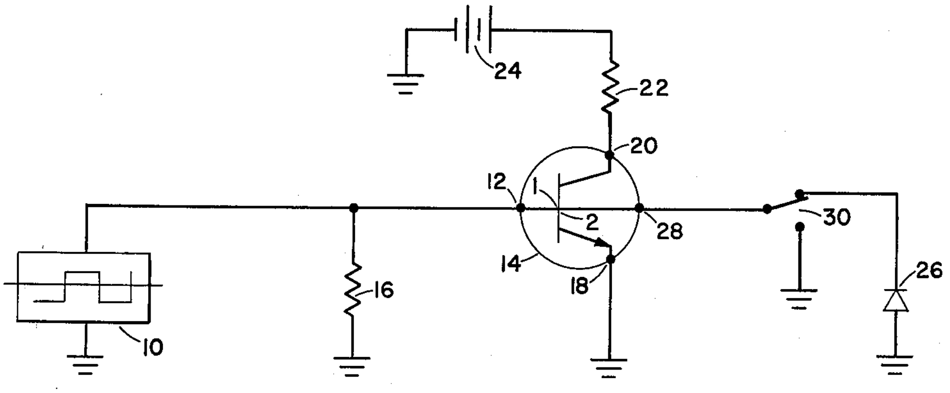
Figure 2:
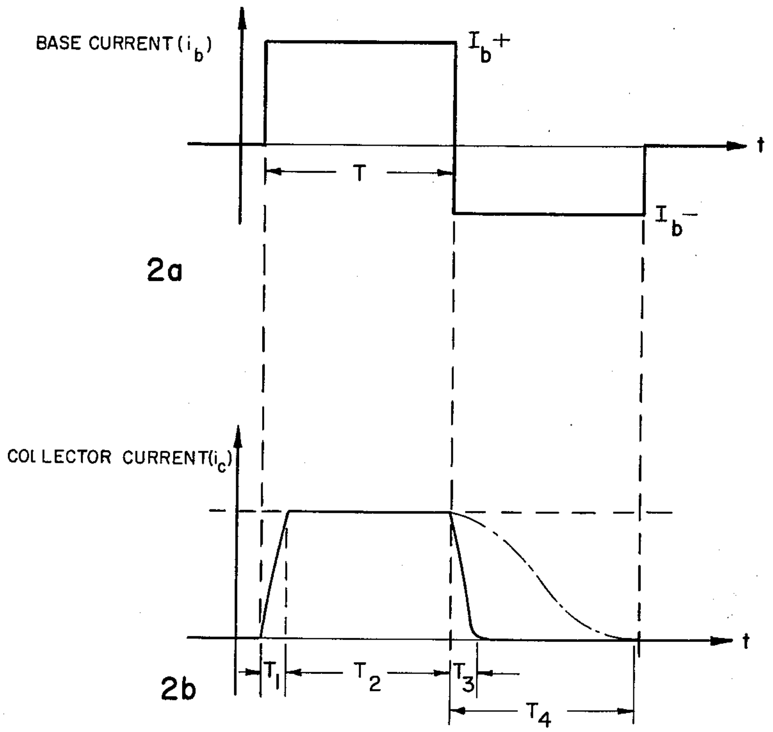

This invention will be more fully understood, and the details more fully explained by the following specification taken with the drawings in which:

FIGURE 1 is a schematic diagram of an embodiment of the invention;

FIGURE 2*a* is a representation of the input waveform; and

FIGURE 2*b* is a representation of the output waveform.

Referring now to FIGURE 1, a source of switching potential 10 is connected between No. 1 base terminal 12 of NPN tetrode transistor 14 and ground across input resistor 16. The emitter terminal 18 is connected to ground and the collector terminal 20 is connected to the load to be switched represented by the series circuit of output load resistor 22 and reverse collector current direct power source 24. The positive terminal of source 24 connects to resistor 22 and the negative terminal of the power source is returned to ground. Diode 26 is connected between No. 2 base terminal 28 and ground thru switch 30, the diode being poled to conduct during the cutoff swing of the signal from switching source 10. As illustrated, base terminal 28 may be connected directly to ground thru switch 30. This will produce the desired effect, but at the expense of some increase in circuit loading during the "on" period.

The operation of the circuit of FIGURE 1 is as follows: consider that the input current $i_b$ has the wave-form shown in FIGURE 2*a*. During the turn-on and saturation times the transistor operates in the conventional manner shown in FIGURE 2*b* with the turn-on time $T_1$ and saturation time $T_2$ illustrated in terms of collector current.

When $i_b$ goes negative, the carriers stored in the base (and trapped) are swept out by virtue of the accelerating field furnished by $i_b-$, applied between base terminals 12 and 28 thru diode 26 which diode offers a low impedance path to a negative input. The collector current therefore starts to decrease immediately in the same manner in which it increased at turn-on and accomplishes turn-off in the brief interval $T_3$. $T_4$ is an approximate illustration of the much longer turn-off time required by a conventional transistor switch. Tests indicate that by means of the present invention that $T_3$ can be made approximately $1/7$ of $T_4$, and only slightly longer than $T_1$, a tremendous improvement.

Diode 26 prevents forward current which would ordinarily cause injection into the base during turn-on from being lost to the second base. For this reason diode 26 should exhibit low reverse conductance and capacitance. On the other hand, to take full advantage of the reverse drive, the forward conductance of this diode should be high. Instead of connection thru diode 26, the second base terminal may be directly grounded with, of course, the increase input loading effect noted above. The signal source resistance should be low. Furthermore, the higher the inter-base resistance, the larger will be the reverse bias pulse needed, since the magnitude of current drawn out of the base is a measure of the effectiveness of stored carriers being removed by the control pulse. For this reason, it may be necessary in certain applications to insert another diode in series with the emitter-base diode of the transistor to prevent it from breaking down when the reverse drive pulse is applied.

It will be realized that the embodiments revealed in the above specification are capable of a large number of applications, hence it is desired that the scope of the appended claim not be limited by the above specification or drawings. Therefore what is claimed and it is desired to secure by Letters Patent of the United States is:

A reduced turn-off time transistor switch comprising a tetrode transistor having a first and second base electrode, an emitter electrode and a collector electrode, an input resistor connected between said first base electrode and said emitter electrode, a source of switching potential connected in parallel with said input resistor, said switching potential providing a positive-negative square wave signal, a source of reverse collector current, an output load resistor connected to said collector electrode, said source of reverse collector current series connected between said emitter electrode and said load resistor, a diode connected between said second base electrode and said emitter electrode, said diode being poled in a direction toward said second base electrode so that said diode conducts on the negative square wave signal.

References Cited in the file of this patent

UNITED STATES PATENTS

| | | |
|---|---|---|
| 2,870,345 | Van Overbeek | Jan. 20, 1959 |
| 2,922,897 | Maupin | Jan. 26, 1960 |
| 2,963,592 | De Graaf | Dec. 6, 1960 |